United States Patent [19]
Arena

[11] Patent Number: 4,561,799
[45] Date of Patent: Dec. 31, 1985

[54] TORQUE JOINT
[75] Inventor: Aldo Arena, Smithtown, N.Y.
[73] Assignee: Grumman Aerospace Corp., Bethpage, N.Y.
[21] Appl. No.: 649,284
[22] Filed: Sep. 11, 1984

Related U.S. Application Data
[62] Division of Ser. No. 347,074, Feb. 8, 1982, Pat. No. 4,513,488.

[51] Int. Cl.[4] .............................................. F16B 1/00
[52] U.S. Cl. .................................... 403/285; 403/375; 403/359; 285/382.2
[58] Field of Search ............... 403/274, 285, 266, 375, 403/345, 359; 285/382.2, 7, 382

[56] References Cited
U.S. PATENT DOCUMENTS

| | | | |
|---|---|---|---|
| 638,554 | 12/1899 | Burton | 285/382.2 |
| 674,394 | 5/1901 | Beck et al. | |
| 700,575 | 5/1902 | Thompson | 285/382.2 |
| 1,291,388 | 1/1919 | Bright et al. | 403/266 |
| 1,329,479 | 2/1920 | Savon | 285/382.2 |
| 1,548,990 | 8/1925 | Garman | 403/285 |
| 1,625,795 | 4/1927 | Crawford | |
| 1,693,838 | 12/1928 | Faudi | |
| 1,693,839 | 12/1928 | Faudi | |
| 2,233,471 | 3/1941 | Clements | 285/375 |
| 2,958,929 | 11/1960 | Vineberg et al. | 29/155.55 |
| 2,976,907 | 3/1961 | Harvey et al. | 285/382.2 |
| 3,160,949 | 12/1964 | Bussey et al. | 29/121 |
| 3,313,536 | 4/1967 | Dutton et al. | 267/64 |
| 3,314,266 | 4/1967 | Werther et al. | 72/256 |
| 3,429,587 | 2/1969 | Kish | 285/382.2 |
| 3,642,311 | 2/1972 | Edgemond, Jr. | |
| 3,788,098 | 1/1974 | Miller et al. | |
| 3,889,511 | 6/1975 | Bayle | 72/370 |
| 4,033,020 | 7/1977 | Hudgens | 29/149.5 NM |
| 4,075,755 | 2/1978 | Bernatt et al. | 29/623 |
| 4,154,082 | 5/1979 | Beech | 72/370 |

FOREIGN PATENT DOCUMENTS
| | | |
|---|---|---|
| 23321 | 8/1883 | Fed. Rep. of Germany. |
| 1332850 | 11/1963 | France ................................. 72/370 |

Primary Examiner—Richard J. Scanlan, Jr.
Attorney, Agent, or Firm—Richard G. Geib; Daniel J. Tick; Bernard S. Hoffman

[57] ABSTRACT

A torque joint for transmission of force in both longitudinal and circumferential direction about thin-wall tubular torque tubes is provided by overlapping an inner one of said tubes and an outer one of said tubes, inserting a mandrel having longitudinal and circumferential slots therein, applying a deformation force for pressing the tubular members into the slots of the mandrels, and extracting at least a portion of the mandrel to provide the torque joint. In the case wherein two open-ended tubular members are employed, two mandrel elements of the same form are utilized, the two mandrel elements being withdrawn from the opposite ends of the joint upon completion of assembly of the joint. In the event that one of the tubular elements is closed ended, a retaining ring is utilized as one of the mandrel elements, in which case only one mandrel element is withdrawn while the ring remains captured between a circumferential groove of the joint and the closed end of the tube.

1 Claim, 7 Drawing Figures

TORQUE JOINT

This is a division of application Ser. No. 347,074 filed Feb. 8, 1982 now U.S. Pat. No. 4,513,488.

BACKGROUND OF THE INVENTION

This invention relates to mechanical systems for the transmission of torque and, more particularly, to a joint and a method of fabricating such joint between two tubular members which transmit a torque.

Mechanical members for the transmission of torque are found in a large variety of mechanical systems ranging from automobiles to aircraft. For example, such structure is found in the drive shaft of an automobile as well as in a drag link used in an automobile steering mechanism. Also, such structure may be found in the mechanism for positioning airflow surfaces in an aircraft.

In the construction of such torque drive units, it is frequently necessary to join together a plurality of members to form the drive unit. The joining of two mechanical members is accomplished by means of a joint which is so configured so as to be able to transmit the torque. Where possible, the members are of tubular construction so as to provide for a savings in weight. Advantageously, the joining together of the members is accomplished with the aid of some form of indentation, as by the use of teeth or axial slots or grooves, so as to insure the transmission of torque without a circumferential slipping between the two members.

In one form of construction, as illustrated in the U.S. Pat. No. 1,291,388 disclosing a torque joint in an automotive drive shaft, one of the members is provided with a solid core while the second member is of tubular construction. The tubular shaft is then swaged upon the core of the other member so as to provide grooves within the tubular member, the grooves of the tublar member being nested within the grooves of the core so as to provide for the transmission of torque.

In the joining of two tubular members in a situation where it is desired to provide for axial tension with slippage in the circumferential direction, by way of constrast to the torque joint, an inner rotating mandrel and outer rotating roller may be utilized to impress a circumferential groove within two overlapping cylindrical structures as is disclosed in the U.S. Pat. No. 2,233,471. Another method of joining two tubular structures in a rigid joint configured for both axial tension and torque transmission is the use of a magnetic pulse for developing a momentary intense force which deforms the material of the two members as is disclosed in the U.S. Pat. No. 2,976,907. Alternatively, a strong shock induced in a fluid transmitting medium surrounding the work pieces to be joined may be utilized as is disclosed in the U.S. Pat. No. 3,163,141. In yet one other form of construction which may be utilized with swaging, the magnetic pulse or the shock method of fabrication is found in U.S. Pat. No. 1,329,479 wherein a relatively thick wall innertube is placed in overlapping relationship with an outer cylindrical member of thin wall construction. The thick wall inner member serves the additional function of a mandrel since it is sufficiently strong to resist the forces of deformation of the outer cylindrical member against the inner member in forming a torque joint.

A problem arises in that none of the foregoing torque joints have construction features useful in the joining together of two thin wall tubular members with provisions for axial and circumferential grooves to provide for the transmission of force, respectively, in the circumferential and in the axial directions. Such a torque joint is most useful in the aeronautics industry wherein it is important to save weight in each of the members of a mechanism utilized in the transmission of torque. Thus, the use of thin wall tubular members joined together by a suitable joint is most desirable.

SUMMARY OF THE INVENTION

The foregoing problem is overcome and other advantages are provided by a torque joint which, in accordance with the invention, provides for the joining together of two thin wall tubular members. The tubes are of different diameters to permit the sliding of one tube within the other so that their respective ends overlap at the site of the torque joint. The wall of each member is sufficiently thin so as to permit a deformation in the walls of both members at the site of overlap of such members in the formation of the torque joint.

In accordance with a construction feature in a first aspect of a method of construction of the invention, two cylindrical mandrels are inserted from opposite ends of the torque joint being fabricated and butted up against each other, each of the mandrels having longitudinal grooves which are to be utilized in the forming of grooves in the two tubular members. In addition, the ends of the mandrels are chamfered so as to provide a circumferential groove at the site of the abutment of the ends of the two mandrels. An external force, sufficient to induce deformation of the material of the tubular members, is then brought to bear upon the tubular members. In the preferred embodiment of the invention, a coil of wire carrying a strong current pulse encircles the overlap region of the members with the mandrels therein. The current pulse induces a strong magnetic field which interacts with the tubular members to compress them against the mandrels and to deform the members so as to provide for the axial and circumferential grooves. Preferably, the tubular members are fabricated of current-conducting material of low resistivity to insure that a strong force is exerted on the tubular members in the magnetic field for the formation of the torque joint.

In an alternative embodiment of the invention, adapted for use in the situation wherein one of the tubular members has a closed end, as for example wherein such tubular member is fixed to a strut or a plate forming a part of a larger structure, one mandrel plus a ring which also serves the mandrel function are utilized for the formation of the torque joint. The ring is inserted ahead of the mandrel, so as to lie within the tubular member having the closed end. The ring plus the chamfered end of the one mandrel provide for a circumferential groove, while the longitudinal grooves are provided by the one mandrel. Upon application of the deformation force, as by means of the foregoing magnetic forming apparatus or alternatively by means of a shock force in a liquid medium, the circumferential and axial grooves are formed within both members at the site of their overlap. The one mandrel is then removed; however, the ring is retained within the torque joint, the ring having been captured by the circumferential groove and the closed end of the tubular member.

BRIEF DESCRIPTION OF THE DRAWINGS

The foregoing features and other aspects of the invention are described in the following description taken in connection with the accompanying drawings wherein.

DESCRIPTION OF THE PREFERRED EMBODIMENT

Figure 1:
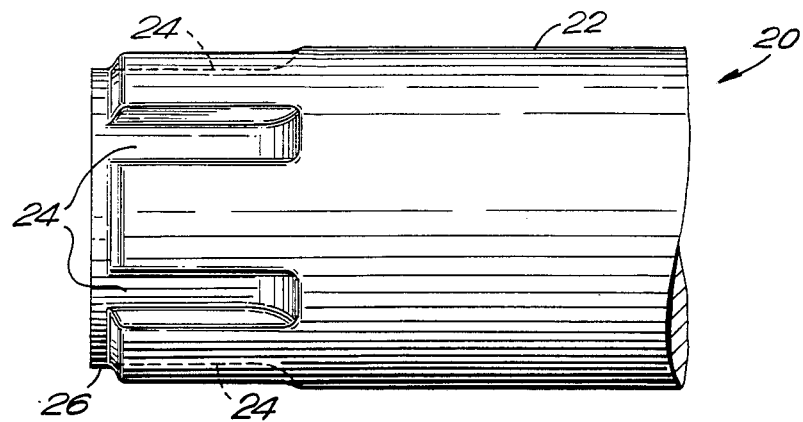
FIG. 1 is an elevation view of one or two mandrels for use in the formation of a torque joint between two open-ended tubular members in accordance with the invention.

Referring now to FIG. 1, a mandrel 20 is formed of a rigid material, such as iron or steel, and includes a cylindrical surface 22 having axially disposed grooves 24 therein. The grooves 24 terminate in a circumferential chamfer 26 of a reduced diameter and having a curvature for forming one-half of a circumferential slot in a torque joint as will be described subsequently.

Figure 2:
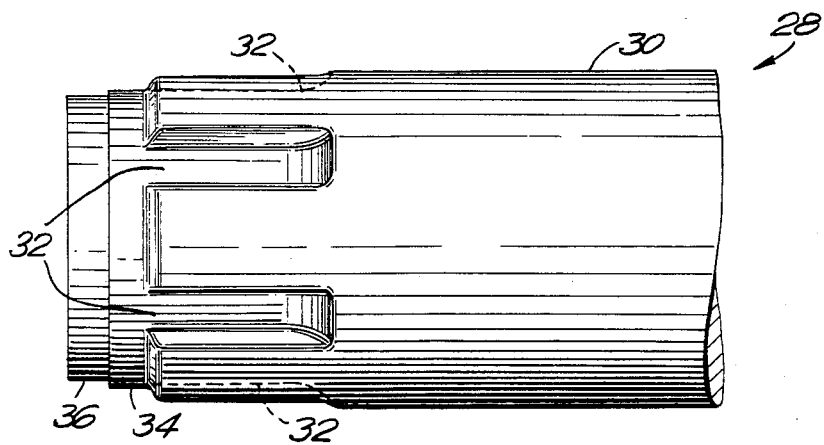
FIG. 2 is an elevation view of a mandrel for use with a retainer ring in forming the torque joint between a closed end and an open-ended tubular member in accordance with the second aspect of the invention.
Figure 3:
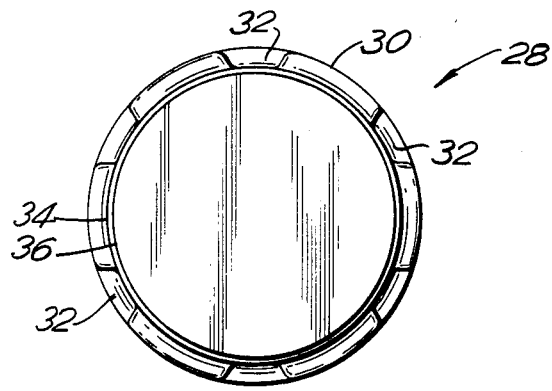
FIG. 3 is an end view of the mandrel shown in FIG. 2.

Referring now to FIGS. 2 and 3, a mandrel 28 is constructed of the same material as the mandrel 20 of FIG. 1, and is provided with a cylindrical surface 30 having axially disposed grooves 32 therein. The grooves 32 terminate in a skirt 34 of a reduced diameter. The skirt 34 has a curvature at the end thereof for forming one edge of a circumferential slot for a torque joint as will be disclosed subsequently. Between the skirt 34 and the terminus of the mandrel 28, there is provided a shelf 36 having a cylindrical surface of still a further reduced diameter for mating with the inner surface of a retaining ring as will be disclosed with reference to FIG. 6.

Figure 4:
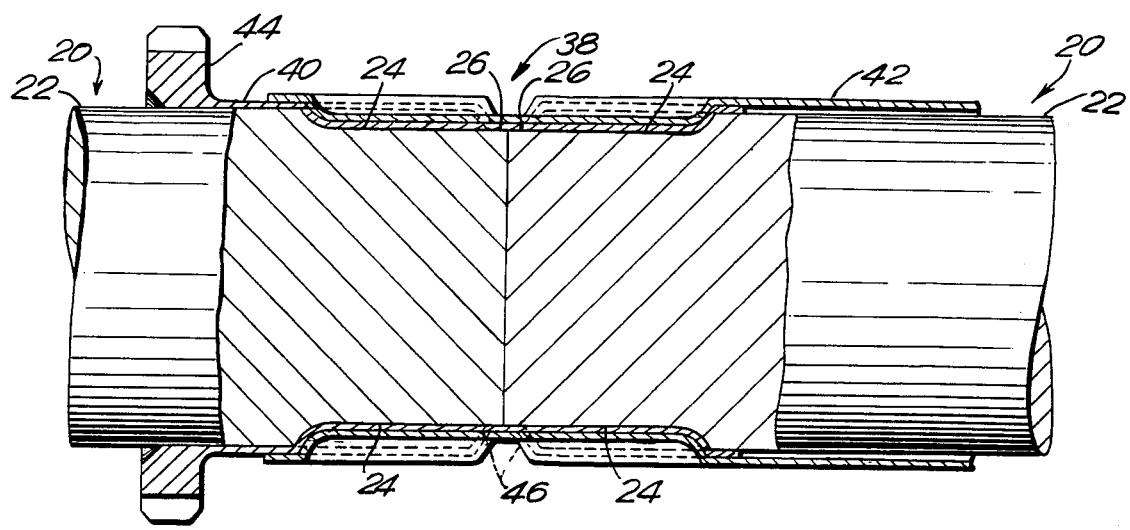
FIG. 4 shows a torque joint formed between two open-ended tubular members using the mandrel of FIG. 1, the tubular members and the mandrel being sectioned to show one mandrel within each half of the torque joint during the fabrication thereof.
Figure 5:
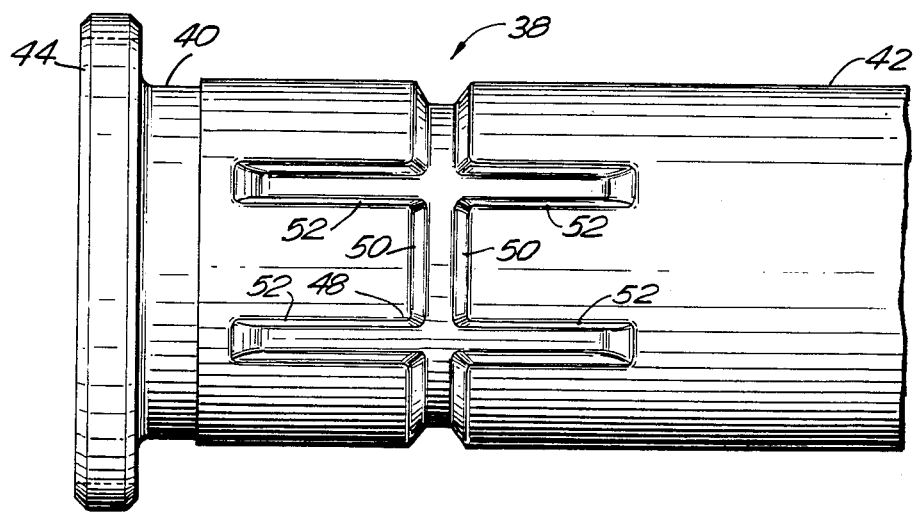
FIG. 5 is an elevation view of the completed torque joint of FIG. 4 upon removal of the mandrels.

Referring now to FIGS. 4 and 5, a torque joint 38 comprises the overlapped region of an inner tubular member 40 and an outer tubular member 42. By way of example, the inner tubular member 40 is provided with an adapter for connection with further structure (not shown), in the form of a collar 44 extending radially outward from the end of the tubular member 40. Two mandrels 20, of the form disclosed in FIG. 1, are inserted from opposite ends of the joint 38 and butted up against each other whereby the circumferential chamfers 26 of each of the mandrels 20 provide a circumferential groove 46. Upon the exertion of the deformation force as by the use of electromagnetic deformation equipment, the material of the members 40 and 42, typically aluminum, is forced inwardly into the grooves 24 and the groove 46 to provide a pattern of grooves within the walls of the tubular members 40 and 42. The groove pattern 48 encircles the torque joint 38 and includes a circumferential slot or groove 50 with axially disposed grooves 52 extending sidewise thereof.

Figure 6:
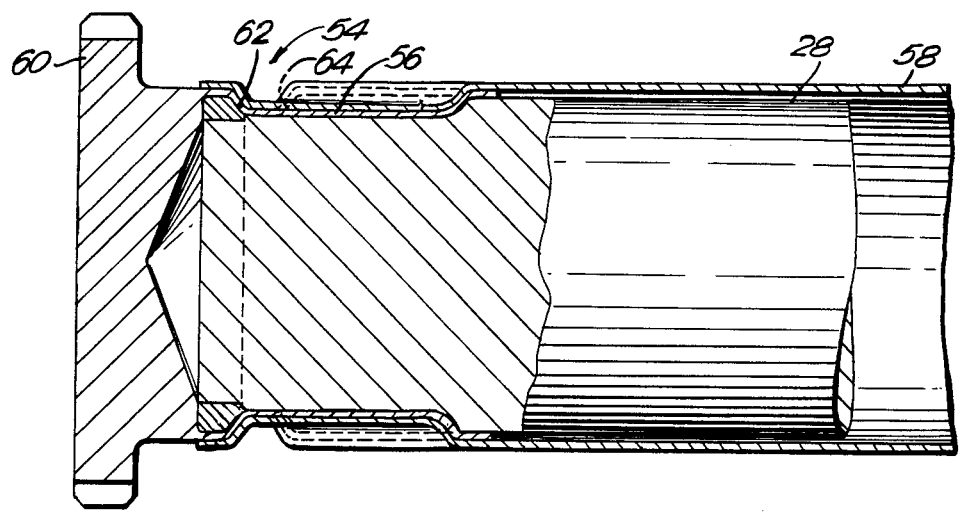
FIG. 6 is a view, similar to that of FIG. 4, showing the use of the mandrel and the retainer ring of FIG. 2 in the formation of a torque joint with a closed end and an open end tubular member, the tubular members and the mandrel and the retainer ring being sectioned to show the mandrel and the retainer ring.
Figure 7:
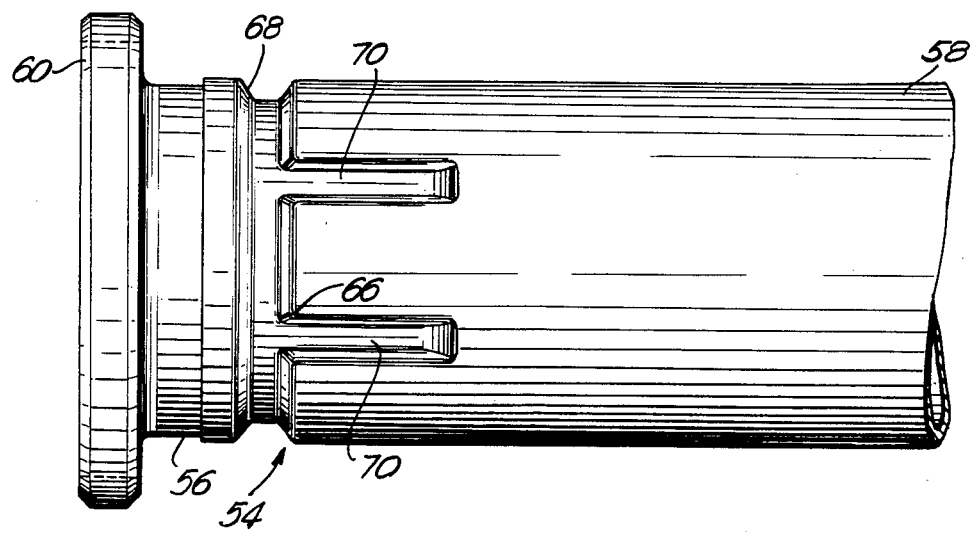
FIG. 7 is an elevation view of the completed torque joint of FIG. 6 upon removal of the mandrel.

Referring now to FIGS. 6 and 7, a torque joint 54 comprises the overlapping region between an inner tubular member 56 and an outer tubular member 58. By way of example, the inner tubular member 56 terminates in an adapter having the form of a fitting 60 which closes off the end of the inner tubular member 56. In the initial stages of the forming of the joint 54, a retainer ring 62 is inserted in the open end of the outer member 58 and pushed into place by the mandrel 28. The shelf 36 of the mandrel 28 engages the inner surface of the ring 62. The edge of the ring 62 facing the mandrel 28 is chamfered to provide, in combination with the skirt 34, a circumferential slot or groove 64. Upon the exertion of a deformation force, as by means of the foregoing electromagnetic apparatus, the inner member 56 and the outer member 58 are compressed into the circumferential groove 64 and the axial groove 32 to produce a groove pattern 66. The groove pattern 66 has a circumferential groove 68 with axially disposed grooves 70 extending from the sides thereof. Upon the conclusion of the fabrication of the torque joint 54, the mandrel 28 is extracted therefrom while the ring 62 is retained therein between the circumferential groove 68 and the fitting 60.

With respect to the method of fabrication, the torque joint 38 of FIGS. 4 and 5 is fabricated by first inserting the end of the inner member 40 into the outer member 42 to provide an overlapping of the members 40 and 42. Thereupon, the two mandrels 20 are inserted into abutting position. The deformation force is then applied followed by the extraction of the mandrels 20. Advantageously, the mandrels 20 are coated with a lubricant to facilitate their extraction.

With respect to the fabrication of the joint 54 of FIGS. 6 and 7, the analogous procedure is followed wherein the end of the inner tubular member 56 is inserted within the open end of the outer tubular member 58 to provide an overlapping relationship. The retainer ring 62 and the mandrel 28 are then inserted via the open end of the outer member 58. Thereupon, the deformation force is applied followed by an extraction of the mandrel 28. The ring 62 remains in its location, having been captured beteen the circumferential groove 68 of the joint 54 and the fitting 60.

It is to be understood that the above-described embodiments of the invention are illustrative only, and that modifications thereof may occur to those skilled in the art. Accordingly, this invention is not to be regarded as limited to the embodiments disclosed herein, but is to be limited only as defined by the appended claims.

What is claimed is:

1. A torque joint, comprising:
    an inner tubular member of thin wall construction and having a circumference and an axis;
    an outer tubular member of thin wall construction and having a circumference and an axis, said outer tubular member being deformed inwardly into said inner tubular member via a circumferential groove and a set of axially disposed grooves, said circumferential groove and said set of axially disposed grooves both joining said inner and outer tubular members to each other and providing a groove pattern such that each axially disposed groove of said set of axially disposed grooves is parallel to each other and said circumferential groove intersects substantially perpendicular each groove of said set of axially disposed grooves so that said inner and outer tubular members of the torque joint are rigidly held against relative axial, circumferential and bending movement simultaneously.

* * * * *